United States Patent [19]
Cargill

[11] Patent Number: 5,560,576
[45] Date of Patent: Oct. 1, 1996

[54] CARGO RESTRAINT ANCHOR DEVICE FOR PICK UP TRUCKS

[76] Inventor: Lee B. Cargill, 924 Pomona Ave., Coronado, Calif. 92119

[21] Appl. No.: 394,617

[22] Filed: Feb. 27, 1995

Related U.S. Application Data

[63] Continuation-in-part of Ser. No. 265,128, Jun. 24, 1994, abandoned.

[51] Int. Cl.⁶ ...................................................... B60R 9/00
[52] U.S. Cl. ................ 248/231.61; 224/403; 248/228.5; 248/503
[58] Field of Search ............................ 248/228.1, 228.4, 248/228.5, 231.51, 231.61, 500, 503, 499; 224/402, 403

[56] References Cited

U.S. PATENT DOCUMENTS

| | | |
|---|---|---|
| 1,834,183 | 1/1930 | Schenk . |
| 2,182,480 | 10/1937 | Lowrey . |
| 4,257,570 | 3/1981 | Rasmussen ............................. 248/503 |
| 4,595,229 | 7/1986 | Wagner . |
| 4,607,991 | 8/1986 | Porter . |
| 4,685,646 | 8/1987 | Harrison . |
| 4,760,986 | 8/1988 | Harrison . |
| 4,846,431 | 7/1989 | Pflieger . |
| 4,850,770 | 7/1989 | Millar . |
| 4,901,963 | 2/1990 | Yoder . |
| 4,948,311 | 8/1990 | St. Pierre et al. . |
| 5,121,960 | 6/1992 | Wheatley ............................. 248/503 X |
| 5,131,780 | 7/1992 | Love . |
| 5,228,739 | 7/1993 | Love . |
| 5,352,078 | 10/1994 | Nasu ................................. 248/228.1 X |

FOREIGN PATENT DOCUMENTS

| | | | |
|---|---|---|---|
| 639411 | 4/1962 | Canada ............................. | 248/231.61 |

Primary Examiner—Alvin C. Chin-Shue
Assistant Examiner—Derek J. Berger

[57] ABSTRACT

A cargo restraint anchor device that attaches at various positions along the top of the side rail of a pick-up truck cargo box and which can be configured and positioned to accommodate a variety of different types of cargo restraining apparatus. The anchor device comprises; an L-bracket, a C-bracket, and a bolt assembly that draws the brackets together. The L-bracket can be reversibly mounted. The L-bracket has an elongated vertical slot through which the barrel of the bolt protrudes. The elongated vertical slot also engages a tab on the lower portion of the C-bracket thereby maintaining alignment between the two brackets and allows the C-bracket to be positioned vertically with respect to the L-bracket. The L-bracket has one or more holes for the attachment of cargo restraining apparatus and/or accessories. The vertically adjustable C-bracket is adaptably capable of receiving the threaded end of the bolt. The bolt not only draws the brackets together to form a clamp when it is tightened but also serves as a mechanical barrier to upward motion of the anchor device.

6 Claims, 4 Drawing Sheets

CARGO RESTRAINT ANCHOR DEVICE FOR PICK UP TRUCKS

This application is a continuation in part to my patent application, Ser. No. 08/265,128 filed on Jun. 24, 1994 entitled, "Cargo Restraint Anchor Device for Pick-up Trucks", now abandoned.

BACKGROUND OF THE INVENTION

1. Field of the Invention

The present invention relates to the restraint of cargo that is loaded in the cargo box of a pick-up truck and specifically addresses a novel device that attaches at various positions to mid along the side rail of the cargo box and functions as an anchor for a cargo restraining apparatus. In the past, there have been many mechanisms that have been used to restrain the movement of pick-up track cargo, all of which require attachment to the truck body. Some of the pick-up trucks currently in production have tie-down hoops welded or bolted to the cargo box frame at the corners mid to which lines, cords mid the like can be attached for restraining cargo. Other trucks are manufactured with holes of various shapes and sizes that serve as locations for tie-downs or other accessory attachment anchors. Many of the older pick-up truck models have no means for restraining cargo other than the cargo box walls and tail gate. None of the pick-up trucks provide for a means of attaching an accessory at locations other than pre-determined positions. The most common solution to this problem is the drilling of holes in the body of the truck to attach a device at a needed position. Although a number of clamp mechanisms have been invented that attach to the side rails, each has limited utility because of either narrow design objectives or design deficiencies. The present invention solves the problem by providing a simple, anchor device that attaches to the side rail of a pick-up track by the use of both mechanical barriers and a clamping force. The anchor device can be positioned at various locations along the side rail, will fit a variety of side rail sizes, and can accommodate a variety of different types of cargo restraints and/or accessories.

2. Description of Prior Art

Rasmussen (U.S. Pat. No. 4,257,570) discloses a tie down assembly for use in securing an object to the cargo area of a pick up truck that is representative of a number of devices in that it requires the drilling of holes in the truck body for attachment of the tie down assembly. St. Pierre et al (U.S. Pat. No. 4,948,311) and Porter (U.S. Pat. No. 4,607,991) disclose tie down devices that fit in stake holes of pick-up truck side walls and are representative of those that use stake holes as the point of attachment. Millas (U.S. Pat. No. 4,850,770) discloses a side rail tie down anchor for pick-up trucks that can be positioned at a variety of fore and aft positions along the side rail by means of a clamp mechanism that clamps to the top of the side rail, but that has limited utility for other than a tie down device. Love (U.S. Pat. Nos. 5,131,780 and 5,228,739) and Yoder (U.S. Pat. No. 4,901,963) disclose clamps that attach a flat plate to the top of the side rail of a pick-up truck mid provide a means of attachment for truck bed caps. Wagner (U.S. Pat. No. 4,595,229) discloses two brackets that form a clamp for fastening a truck bed liner to the top in-board flange of a pick-up truck side rail. Lowrey (U.S. Pat. No. 2,182,480), Schenk (U.S. Pat. No. 1,834,183) and Pflieger (U.S. Pat. No. 4,846,431) disclose clamp mechanisms that utilize two members pulled together by a screw with the members joining at one end by a tongue & groove arrangement and the other end comprising the jaw of the clamp. Harrison (U.S. Pat. Nos. 4,685,646 and 4,760,986) discloses a mount for pick-up trucks that utilizes a clamp that attaches to the inboard flange of a cargo bed side rail; however, the mount is complex and utilizes a variety of additional brackets and various shapes for the inboard piece of the clamp to mount objects to it.

OBJECTS OF THE INVENTION

The broad object of this invention is to provide a practical anchor device capable of accommodating a wide variety of pick-up truck cargo restraining apparatus and/or accessories.

A further object of the invention is to provide such a device that can be used with all pick-up trucks having a cargo box side rail with a downward protruding flange extending from either the inboard or outboard edge of the top of the side rail—a "one size fits all" design objective.

A further object of the invention is to provide such a device that is extremely functional and easy to use, requiring no more than one common tool to install.

A further object of the invention is to provide an anchor that can be manufactured at low-cost by virtue of a simple design with a minimum of parts thereby making the anchor a commercially inexpensive and viable product.

SUMMARY OF THE INVENTION

The cargo restraint anchor is a versatile device that is capable of being attached to a pick-up truck cargo box side rail having a flange that protrudes downward from the top of the side rail. The anchor can be located at a wide range of fore and aft positions along the side rail to accommodate the needs of load restraining apparatus that can be attached to it. The cargo restraint anchor device utilizes both mechanical barriers and a clamping force and consists of;

a reversibly mountable L-bracket that has a vertical stem with an elongated vertical slot that provides the L-bracket to be vertically adjustably positioned and a horizontal extension at the top with one or more holes for the attachment of cargo restraints, a detachable and vertically adjustable C-bracket that is designed to interface with either the inner or outer face of the vertical stem of the L-bracket in a manner that causes the brackets to be aligned when a clamping force is applied, the bottom of the C-bracket functioning as the clamp fulcrum and the top of the C-bracket functioning as the clamp jaw.

a vertically adjustable bolt that provides a mechanical barrier to upward movement of the anchor and that has a head and washer combination that captures the L-bracket and screws into the C-bracket adapted to receive said bolt thereby forcing the brackets together providing a clamping force when the bolt is tightened.

The L-bracket of the cargo restraint anchor device can be positioned with its horizontal extension facing either toward or away from the side rail. When it is facing toward the side rail, the horizontal extension protrudes over the top of the truck side rail thereby restricting downward movement of the anchor. When it is facing away from the side rail, a horizontal beam or the like can be adaptably connected to the horizontal extension by means of a bolt or the like. When the adaptably connected horizontal beam protrudes over the top of the side rail, the L-bracket and horizontal beam combine to form a mechanical barrier restricting downward movement of the anchor.

The anchor device is restricted from moving upward by both the frictional forces of the clamping surfaces and by a mechanical barrier that is formed by the clamp bolt. Except for its head and attached washer, the clamp bolt protrudes through the elongated vertical slot in the L-bracket and is threaded into the C-bracket adaptably configured to receive said bolt. Thus joined, the clamp bolt and C-bracket are positioned vertically upward until the barrel of the bolt comes into contact with the bottom of the downward protruding flange of the side rail. A tab on the lower portion of the C-bracket engages the elongated vertical slot of the L-bracket, thereby locking the brackets together as the bolt is tightened. This results in a mechanical barrier in the form of the clamp bolt that prevents vertical upward movement of the joined brackets. It also results in the efficient utilization of the clamping force generated by the bolt rotation because the bolt is positioned adjacent to the pressure plate located at the top of the C-bracket and allows for good clamp pressure with hand tightening of an eye bolt.

The friction forces of the clamping surfaces created by the tightening of the clamp bolt, the aforementioned mechanical barriers that further restrict vertical movement of the clamp apparatus, and the mechanical barriers formed by the combined brackets of the clamp apparatus that restrains any inward or outward horizontal movement all combine to provide a very secure device to which cargo restraining apparatus and/or accessories can be anchored.

A variety of cargo restraining apparatus can be attached to the cargo restraint anchor device, the most simple and possibly most useful being stretch cords, lines or the like that can be routed through the eye of the head of clamp bolt. A 'hand-tight' clamp condition will provide sufficient clamping force for the attachment of many load restraints. A common tool can be used to achieve a very tight clamp condition if desired.

The horizontal extension of the L-bracket can be used to attach a horizontal beam that can span the width of the cargo box. The cargo restraint anchor device allows such a cross-beam thus attached to be positioned fore and aft as required to restrain the movement of a cargo load.

BRIEF DESCRIPTION OF THE DRAWINGS

The present invention will be more fully understood by reference to the following detailed description thereof when read in conjunction with the attached drawings, and wherein.

DESCRIPTION OF THE PREFERRED EMBODIMENT

Figure 1:
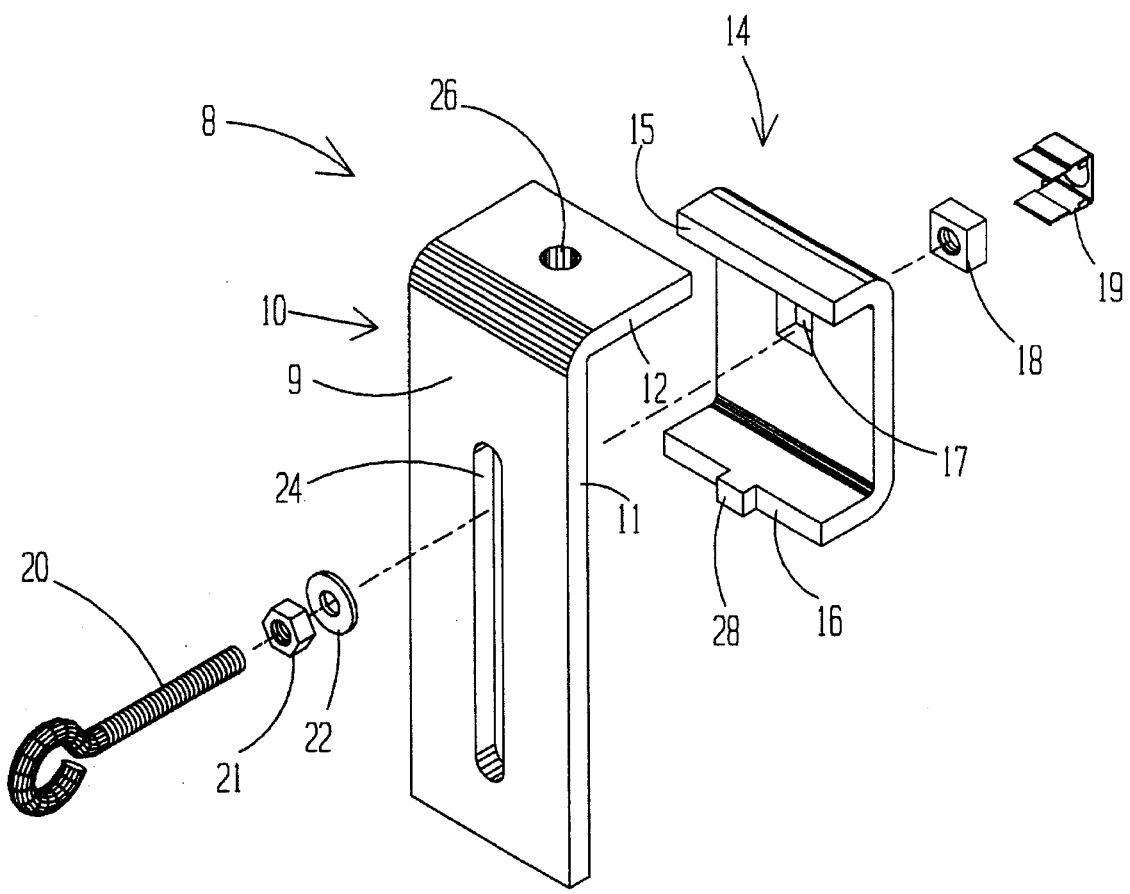
FIG. 1 is an exploded view perspective drawing of the cargo restraint anchor device.

FIG. 1 is an exploded view of a cargo restraint anchor device assembly 8 comprising; an L-bracket 10 with a vertical stem 11 having inner and outer vertical faces 9 (only one vertical face is can be seen in the isometric illustration of FIG. 1) and a horizontal extension 12, a C-bracket 14 having an upper pressure plate 15 and a lower pressure plate 16 and provisions in its center section for receiving a threaded clamp bolt 20 with a nut 21 and washer 22 for clamping the L-bracket 10 to the C-bracket 14. Said provisions for receiving the bolt could be a threaded hole, however a more economical configuration is square hole 17 that accommodates a nut retainer assembly comprised of a nut 18 and a nut retainer 19. A tab 28 protrudes from the lower pressure plate 16 and engages an elongated vertical slot 24 in the vertical stem 11 of the L-bracket 10. The elongated vertical slot 24 also accommodates the protrusion of the barrel of the clamp bolt 20 but restrains the assembled washer, nut mid clamp bolt head. An eye-bolt is shown in FIG. 1; however the head of the clamp bolt 20 could also be of another configuration such as a hex bolt or the like for attaching cargo restraint devices and or accessories. Vertical slot 24 allows the clamp bolt and C-bracket to be positioned at a variety of vertical positions relative to the L-bracket to accommodate a variety of pick-up track side rail dimensions. It also facilitates the easy attachment of the device to a side rail. The combination of the elongated vertical slot 24, the protruding bolt barrel 20 and the engaged tab 28 keeps the two brackets aligned. The horizontal extension 12 of L-bracket 10 has a hole 26 for attachment of a variety of cargo load restraints and/or accessories in a manner later to be described. Both the upper pressure plate 15 and lower pressure plate 16 of C-bracket 14 are forced toward the opposing face of vertical stem 11 of the L-bracket when the bolt 20 is tightened. The cargo restraint anchor is positioned so that a truck side rail is placed above the clamp bolt 20 and between the upper pressure plate 15 of the C-bracket and opposing face of L-bracket 10 in a manner later described.

Figure 2:
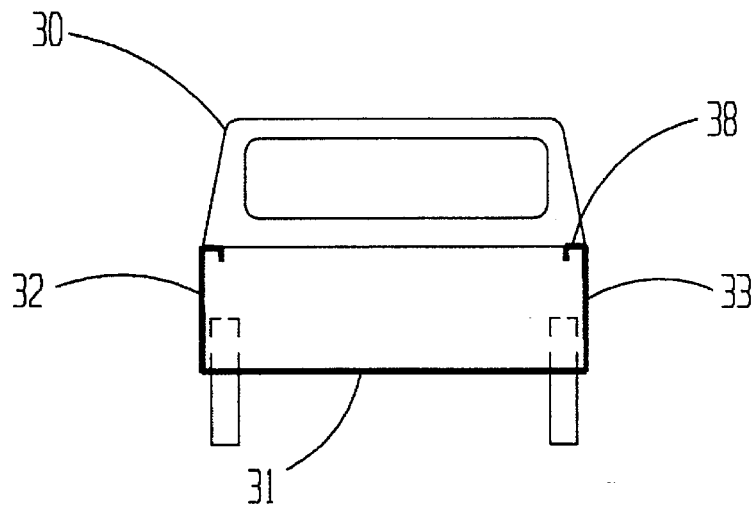
FIG. 2 is a perspective illustration of the rear end of a pick-up truck showing the cargo floor and side walls.

FIG. 2 is a perspective illustration of a pick-up truck cargo floor mid side walls. A pick-up truck 30 is shown as viewed from the rear of the truck with a typical cargo bed configuration. Shown in FIG. 2 is the floor 31 and sides 32 and 33 of the general shape shown. The upper portion of the side wall 33 constitutes the side rail 38 is further described in FIG. 3. A typical upper side wall of newer trucks includes a vertical outer wail that makes a 90 degree bend at the top as shown and after going inward slightly (up to approximately 3 inches), makes a bend downward, forming an inner vertical flange that protrudes downward typically 1 to 2 inches. The horizontal top of the side wall combined with the clown ward protruding flange constitute a side rail 38 as shown.

Figure 3:
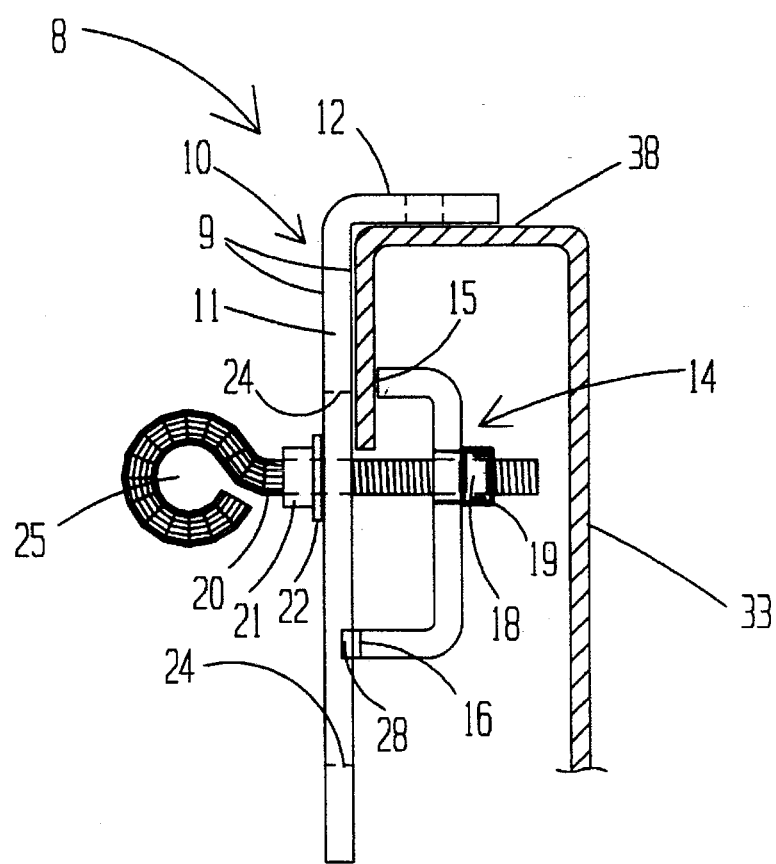
FIG. 3 is a cross section of the right side rail in FIG. 2 showing a side view of the cargo restraint anchor device attached in a tie down configuration.

FIG. 3 is a side view of the cargo restraint anchor device assembly 8 in a tie down configuration and shows the general positioning of the L-bracket 10, the C-bracket 14, and clamp bolt 20 with respect to the side rail 38 of wall 33 in FIG. 2. In this configuration, the nut 21 is screwed as far as possible up the barrel of the clamp bolt 20 toward the eye followed by the washer 22. The barrel of the clamp bolt then passes through the slot 24 of the L-bracket 10 and is threaded into the nut 18 that is held in place by the nut retainer 19 that is attached to the C-bracket 14. The eye 25 of the clamp bolt head serves as a tie-down orifice for lines, ropes or the like. The horizontal extension 12 of L-bracket 10 rests on top of the side rail 38. This configuration is particularly useful not only because of the tie down function it performs but also because it can be installed and removed without the use of any tools. The C-bracket 14 is limited in its upward positioning by the clamp bolt. Clamp bolt 20 and attached C-bracket are moved upward until barrel of clamp bolt comes into contact with the lower end of the side rail flange. Elongated vertical slot 24 in the L-bracket allows for the vertical positioning of the clamp bolt with attached C-bracket relative to the L-bracket. When the clamp bolt with attached C-bracket are positioned as far up as possible, the brackets are forced together by screwing motion of the clamp bolt. The lower portion of the C-bracket 14 has a tab 28 that protrudes from the lower pressure plate 16 and engages the vertical slot 24 of the L-bracket, thereby keeping the two brackets in alignment. The lower pressure plate 16 of the C-bracket functions as the clamp fulcrum and the upper pressure plate 15 of C-bracket function as the clamp jaw. The combination of clamping force and mechanical barriers combine to provide a very secure cargo restraint anchor when attached to the side rail as shown in FIG. 3.

The cargo restraint anchor device is small in size. A pair of anchor devices would fit in a box or bag measuring approximately 5 inches×3 inches×1.5 inches in size. It is envisaged that either two or four anchors would normally be desired for a pick-up truck and they probably would be placed in a bag that could easily be stowed behind or under the driver's seat for ease of use.

Figure 4:
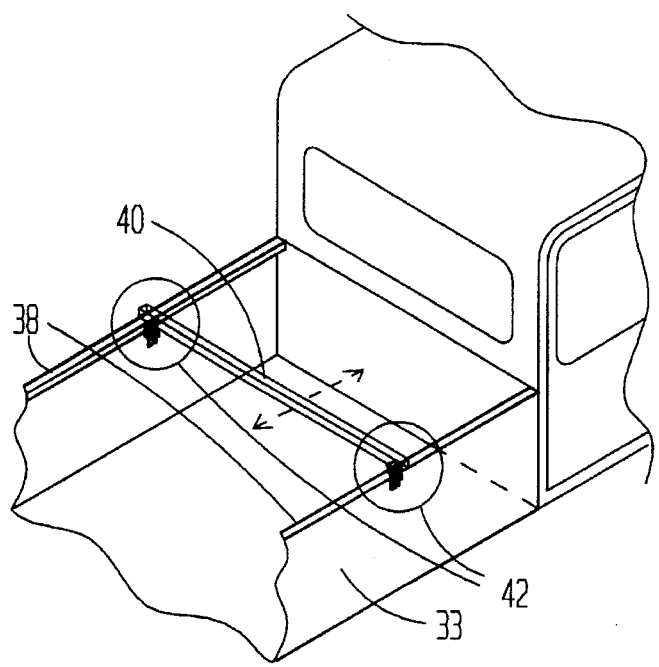
FIG. 4 is perspective view of a pick-up truck cargo area with a cross-beam attached to side rails using a reversibly configured cargo restraint anchor device.
Figure 5:
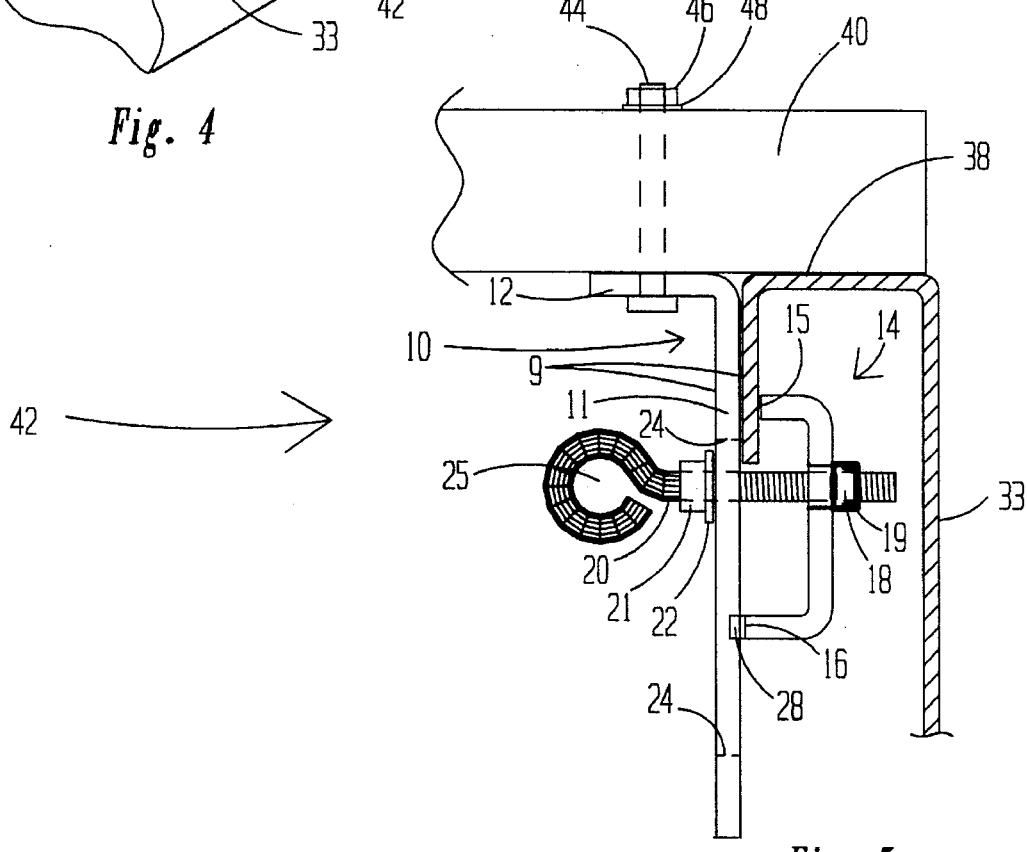
FIG. 5 is a drawing showing the interface of the cargo restraint anchor device with the end of the cross-beam of FIG. 4.

FIG. 4 is an illustration of the forward section of a pick-up truck cargo box and shows a cross-beam 40 that spans the width of a cargo box and is attached to the top of side rails 38 using a reversibly configured cargo restraint anchor device, with the interface 42 between the beam, rail, mid cargo restraint anchor shown in detail in FIG. 5. Because a cargo restraint anchor can be positioned at a variety of positions fore and aft along the side rail, the cross-beam can be positioned where needed.

FIG. 5 is a drawing showing the details of the interface 42 of the cargo restraint anchor, side rail and cross-beam shown generally in FIG. 4. It should be noted that the L-bracket 10 is configured so that its horizontal extension 12 faces inward (as compared to the outward configuration in FIG. 3), providing clearance for a bolt 44 to adaptably connect the L-bracket to the cross-beam 40. As shown in FIG. 5, a bolt 44 protrudes through the horizontal extension and cross-beam and is secured on the top of the cross-beam with a washer 48 and nut 46. In this configuration, the portion of the cross-beam that protrudes over the top of the side rail functions in combination with the attached L-bracket to restrict downward vertical movement of the anchor. The vertically adjustable clamp bolt 20, nut 21, washer 21, and vertically adjustable C-bracket 14 function as previously described in attaching the cargo restraint anchor device to the side rail.

Figure 6:
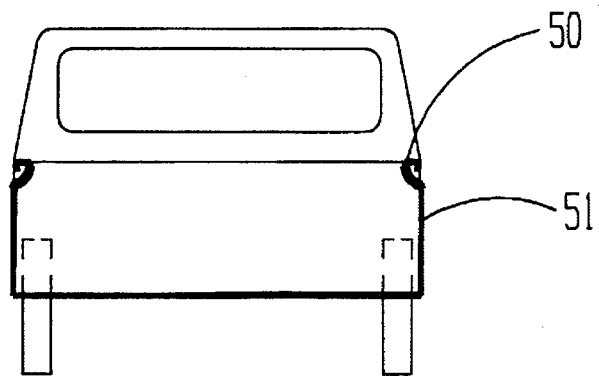
FIG. 6 is a perspective illustration of the rear end of a pick-up truck showing the cargo floor and side walls with a side rail configuration that is representative of many older pick-up trucks.

FIG. 6 is a perspective illustration of a pick-up truck cargo floor and side walls showing a different side rail configuration that is found on many of the older light duty pick-up trucks. The upper portion of the side wail 51 constitutes the side rail 50 and is further described in FIG. 7. With this side rail configuration, the downward protruding flange is located on the outside of the cargo box.

Figure 7:
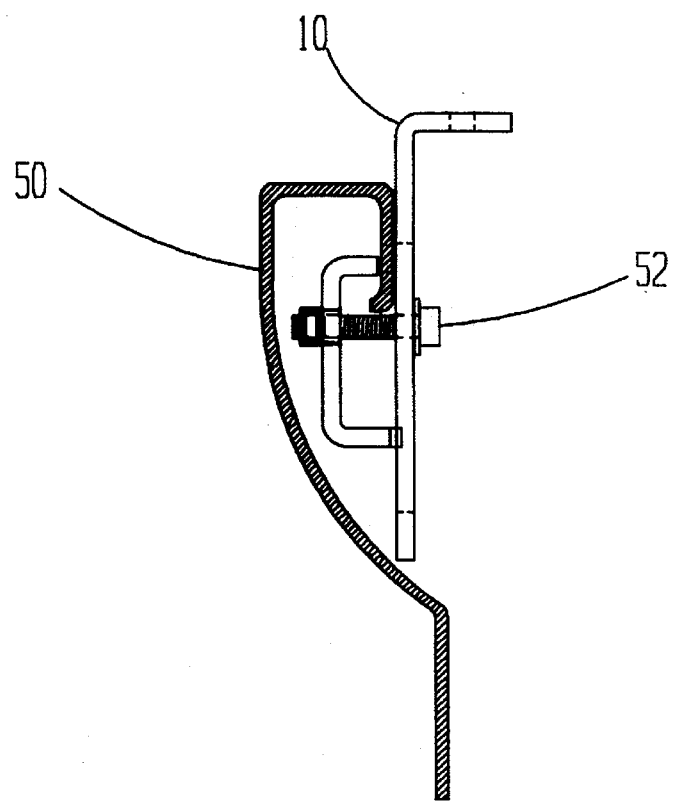
FIG. 7 is a cross section of the right side rail in FIG. 6 showing a side view of the cargo restraint anchor device attached to it.

FIG. 7 is a cross section of the right side rail 50 shown generally in FIG. 6 illustrates a side view of the cargo restraint anchor device attached to the side rail mid shows the versatility of the anchor device. The L-bracket 10 has its horizontal extension facing outward in FIG. 7. It could also face inward. A hex bolt is shown as the clamp bolt 52 in this configuration for purpose of illustration.

I claim:

1. A cargo restraint anchor device in combination with a pick-up truck including a cargo box with side rails having a downward protruding flange, said anchor device capable of being attached at a variety of positions along a side rail and said anchor device comprising:

an L-bracket, a C-bracket, and a means for drawing the brackets together securing said brackets to said side rail when the side rail is placed between the brackets, and an alignment means that keeps the brackets aligned to each other and provides for vertical adjustability between the brackets for accommodating a wide variety of truck side rail dimensions;

said L-bracket comprising a vertical stem having outer faces with either face capable of being positioned against said side rail depending on the cargo restraint employed, and said vertical stem adapted to accommodate one end of the means of drawing the brackets together, and a horizontal extension located at the top of the said vertical stem thereby forming an inverted-L shape, with the horizontal extension capable of protruding over the top of the side rail and capable of being reversed in position for forming a supporting structure for a horizontal restraint member;

said C-bracket comprising an upper end, a middle section, and a lower end, said upper end having a pressure plate that functions as a jaw of a clamp when the brackets are drawn together, said middle section adapted to accommodate the other end of the means for drawing the brackets together, and said lower end adapted to function as a fulcrum when the brackets are drawn together.

2. The anchor device of claim 1 wherein said means of drawing the brackets together is a bolt, the barrel of which passes through each bracket, said bolt having provisions at each end to draw the brackets together.

3. The bolt of claim 2 further including a head with an eye configuration, said eye further providing a means of attachment of a cargo restraining line.

4. The anchor device of claim 1 wherein the horizontal extension at the top of said L-bracket further includes a means for securing to a horizontal restraint member.

5. The anchor device of claim 1 where in the alignment means further comprises an elongated slot located in the vertical stem of the L-bracket and a protrusion extending from the lower end of the C-bracket, said protrusion engaging said elongated slot when the brackets are drawn together and that in combination with said means of drawing the brackets together enables said C-bracket to be adjusted vertically with respect to said L-bracket while maintaining alignment.

6. A cargo restraint anchor device in combination with a pick-up truck including a cargo box with side rails having a downward protruding flange, said anchor device capable of being attached at a variety of positions along a side rail and said anchor device comprising:

an L-bracket, a C-bracket, and a means for drawing the brackets together securing said brackets to said side rail when the side rail is placed between the brackets, and an alignment means that keeps the brackets aligned to each other and provides for vertical adjustability between the brackets for accommodating a wide variety of truck side rail dimensions;

said L-bracket comprising a vertical stem having outer faces with either face capable of being positioned against said side rail depending on the cargo restraint employed, and said vertical stem adapted to accommodate one end of the means of drawing the brackets together, and a horizontal extension located at the top of the said vertical stem thereby forming an inverted-L shape, with the horizontal extension capable of protruding over the top of the side rail and capable of being reversed in position and adaptably connected to a horizontal restraint member;

said C-bracket comprising an upper end, a middle section, and a lower end, said upper end having a pressure plate that functions as a jaw of a clamp when the brackets are drawn together, said middle section adapted to accommodate the other end of the means for drawing the brackets together, and said lower end adapted to function as a fulcrum when the brackets are drawn together;

said means of drawing the brackets together further includes a bolt, the barrel of which passes through each bracket, said bolt having provisions at each end to draw the brackets together; and said alignment means further comprising an elongated slot located in the vertical stem of the L-bracket and a protrusion extending from the lower end of the C-bracket, said protrusion engaging said elongated slot when the brackets are drawn together and that in combination with said bolt that draws the brackets together enables said C-bracket to be adjusted vertically with respect to said L-bracket while maintaining alignment.

* * * * *